US009584004B2

(12) United States Patent
Thompson

(10) Patent No.: US 9,584,004 B2
(45) Date of Patent: Feb. 28, 2017

(54) REGENERATIVE POWER SUPPLY SYSTEM AND METHOD

(71) Applicant: CONSTRUCTIVE INDUSTRIES, LLC, Dublin, OH (US)

(72) Inventor: Barry Thompson, Dublin, OH (US)

(73) Assignee: Constructive Industries, LLC, Dublin, OH (US)

( * ) Notice: Subject to any disclaimer, the term of this patent is extended or adjusted under 35 U.S.C. 154(b) by 423 days.

(21) Appl. No.: 14/206,445

(22) Filed: Mar. 12, 2014

(65) Prior Publication Data
US 2014/0265695 A1 Sep. 18, 2014

Related U.S. Application Data

(60) Provisional application No. 61/779,948, filed on Mar. 13, 2013.

(51) Int. Cl.
| | | |
|---|---|---|
| *H02K 47/00* | (2006.01) | |
| *H02K 53/00* | (2006.01) | |
| *H02J 3/38* | (2006.01) | |
| *H02J 3/32* | (2006.01) | |
| *H02J 7/14* | (2006.01) | |
| *H02J 7/35* | (2006.01) | |

(52) U.S. Cl.
CPC ............... *H02K 47/00* (2013.01); *H02J 3/32* (2013.01); *H02J 3/383* (2013.01); *H02J 7/1415* (2013.01); *H02J 7/35* (2013.01); *H02K 53/00* (2013.01); *Y02E 10/563* (2013.01); *Y02E 10/566* (2013.01); *Y02E 70/30* (2013.01); *Y10S 74/09* (2013.01)

(58) Field of Classification Search
CPC . H02K 47/00; H02K 53/00; H02J 3/32; H02J 7/35; H02J 3/383; H02J 7/1415; Y02E 10/653; Y02E 10/563; Y02E 10/566; Y02E 70/30; Y02E 74/09; Y10S 74/09
USPC .................. 310/113, 122, 138, 12.13, 10
See application file for complete search history.

(56) References Cited

U.S. PATENT DOCUMENTS

| | | | | |
|---|---|---|---|---|
| 6,155,364 A * | 12/2000 | Nagano | ................... | B60K 6/365 180/65.235 |
| 6,843,751 B2 * | 1/2005 | Yang | ...................... | B60K 6/383 477/3 |
| 2007/0126236 A1 * | 6/2007 | Tamura | ..................... | F01P 9/06 290/40 C |
| 2009/0015193 A1 * | 1/2009 | Esaka | ...................... | B60K 6/28 320/103 |
| 2010/0096199 A1 * | 4/2010 | Raynor | .................... | B60K 8/00 180/65.31 |

* cited by examiner

*Primary Examiner* — Naishadh Desai
(74) *Attorney, Agent, or Firm* — Moser Taboada

(57) ABSTRACT

A regenerative power supply system and method comprises a dynamo-electric generator, an electric drive motor coupled to the generator, a transmission device coupling the generator to the electric drive motor, and an energy storage device configured to provide a backup power supply to the regenerative power supply system. An electronic control device is configured to control a flow of electricity to the electric drive motor. An energy storage management device is configured to control a flow of electricity between the electronic control device and the energy storage device.

12 Claims, 4 Drawing Sheets

REGENERATIVE POWER SUPPLY SYSTEM AND METHOD

CROSS-REFERENCES TO RELATED APPLICATIONS

This application claims the benefit of U.S. Provisional Patent Application No. 61/779,948.

STATEMENT REGARDING FEDERALLY SPONSORED RESEARCH OR DEVELOPMENT

Not Applicable

PARTIES TO A JOINT RESEARCH AGREEMENT

Not Applicable

FIELD OF THE INVENTION

This invention is directed generally to electrical power generation, storage and transmission systems and methods and, more particularly, to an electrical power generation, storage and transmission system and a method for supplying power continuously to meet load demands on-site, provide surplus power to a local electrical utility system grid, and/or maintain a stand-alone power supply and storage system isolated from an electrical utility system grid.

BACKGROUND

Typically, on-site power generation or energy storage tends to be designed for use only as a backup energy source in the event of the disruption of supply from a normal source of electricity such as a local electrical utility. Those methods may take the form of combustion, piston driven engines that consume fossil fuels such as natural gas, petroleum products or propane. They can be loud and produce greenhouse gases known to contribute to the effects of global warming. These generators are typically for emergency use or for the regulation of power supply to the facility to ensure a steady flow of power so that sensitive electronic devices or data are not damaged (or lost) by power fluctuations as would be the primary function of traditional uninterruptible power supply (UPS) systems. They require energy inputs that once consumed cannot be reclaimed for use in a regenerative cycle of electricity production.

Other distributed (on-site) power generation methods involving harvesting renewable resources such as solar energy also face the same limitation of being unable to regenerate their own energy inputs. Furthermore, renewable energy systems, when utilized alone are dependent on natural cycles such as seasonal fluctuations in potential energy available for harvesting and diurnal cycles that limit reliable daily access to energy inputs (e.g., sunlight). In general, on-site power generation is desirable because it minimizes the energy losses that occur in fossil fueled power plants and the losses in electricity transmission lines to the end user. Accordingly, power generated and utilized on-site is more energy efficient than that produced remotely.

It is desirable to have access and control over an on-site power supply that is safe, quiet, clean, sustainable, inexpensive, abundant and ultra-efficient in its ability to maximize the electricity-generating capabilities of its constituent components while minimizing energy losses. Furthermore, such a power supply system that may generate its own energy to initiate and sustain a continuous cycle of power generation is inherently valuable in financial and environmental terms. The self-sufficiency that results from such a method of power generation also increases the energy security of a particular user (or site) that requires secure and dependable access to an uninterrupted supply of power.

It is also desirable to employ a method of electricity generation that recaptures some of its own energy production so as to regenerate its own energy supply required to drive the process. There is the potential to greatly reduce the cost of one's own energy supply by utilizing such a method as described in the present invention. Eliminating dependence on the local, regional, national and global energy markets and power generation utilities also eliminates the risks associated with these infrastructural networks and commodities; the cost of fossil fuels and electricity rates will continue to rise over time, sometimes precipitously.

The semi-regulated nature of the American energy markets allows electrical utilities to pass on the capital cost of infrastructure improvements to the consumer with approval by state and local governments. A system that recaptures its own energy production also alleviates the effects of global warming in that it reduces one's carbon footprint by producing power without the need for fossil fuels and without producing greenhouse gas emissions of its own.

While many improvements in technology have advanced the energy efficiency of our society, the pervasiveness of technology in every facet of American life and a growing population of citizens and technology users has resulted in a growing dependence on electricity to sustain the American lifestyle and economy. As our nation's energy infrastructure ages and our demand for electricity grows, it is vital that we develop every means possible to generate power as efficiently and as abundantly as possible while being as self-sufficient as we are able, both collectively and individually.

BRIEF SUMMARY

In accordance with an aspect of the invention, a regenerative power supply system is provided comprising a dynamo-electric generator, an electric drive motor coupled to the generator, a transmission device coupling the generator to the electric drive motor, an energy storage device configured to provide a backup power supply to the regenerative power supply system, an electronic control device configured to control a flow of electricity to the electric drive motor, and an energy storage management device configured to control a flow of electricity between the electronic control device and the energy storage device.

In accordance with further aspects of the invention, the transmission device may comprise a first wheel coupled to the electric drive motor, a second wheel coupled to the dynamo-electric generator that is smaller than the first wheel, and mechanical drive linkage coupling the first wheel and the second wheel such that the dynamo-electric generator rotates at an angular velocity greater than an angular velocity of the electric drive motor. Additionally, the regenerative power supply system may further comprise a distributed power source distinct from an electrical grid power source. The distributed power source may be a solar photovoltaic array configured to recharge the energy storage device. The dynamo-electric generator may supply electricity to meet load demands of the regenerative power supply system, supply electricity to a local electrical utility system grid, or supply electricity to the energy storage device. The regenerative power supply system of the present invention may further comprise a power inverter configured to convert direct current electricity stored in the energy storage device or generated by the distributed power source into alternating current to meet load demands of the regenerative power supply system or the electric drive motor, or to provide supplemental electricity to the electrical grid power source. Additionally, the regenerative power supply system may further comprise a second power inverter configured to convert direct current electricity produced by the dynamo-electric generator into alternating current to recharge the energy storage device, meet load demands of the regenerative power supply system or provide supplemental electricity to the electrical grid power source. The energy storage device of the present invention may comprise an electrical battery bank. Further, the electronic control device may comprise an alternating current transfer control switch and fused disconnect panel to control flow of alternating current electricity within the regenerative power supply system and the energy storage management device may control a flow of electricity between the electronic control device and the energy storage device.

In accordance with a further aspect of the present invention, a regenerative power supply method is provided comprising providing a dynamo-electric generator, providing an electric drive motor coupled to the generator, providing a transmission device coupling the generator to the electric drive motor, providing a backup power supply with an energy storage system, controlling a flow of electricity with an electronic control device, and controlling a flow of electricity between the electronic control device and the energy storage device using an energy storage management device such that the energy storage device meets on-site load demands or provides supplemental electricity to an electrical grid power source.

According to further aspects of the present invention, the transmission device may further comprise a first wheel coupled to the electric drive motor, a second wheel coupled to the dynamo-electric generator that is smaller than the first wheel and mechanical drive linkage coupling the first wheel and the second wheel such that the dynamo-electric generator rotates at an angular velocity greater than an angular velocity of the electric drive motor. The regenerative power supply method may further comprise providing a distributed power source distinct from an electrical grid power source, wherein the distributed power source comprises a solar photovoltaic array configured to recharge the energy storage device. Additionally, the regenerative power supply method may further comprise converting direct current electricity stored in the energy storage device or generated by the distributed power source into alternating current with a first power inverter to meet on-site load demands or demand of the electric drive motor, or to provide supplemental electricity to the electrical grid power source. Additionally, the regenerative power supply method may even further comprise converting direct current electricity produced by the dynamo-electric generator into alternating current with a second power inverter to recharge the energy storage device, meet on-site load demands of the regenerative power supply system or provide supplemental electricity to the electrical grid power source. The energy storage device may comprise an electrical battery bank. Additionally, the electronic control device may comprise an alternating current transfer control switch and fused disconnect panel to control flow of alternating current electricity within the regenerative power supply system and the energy storage management device may control a flow of electricity between the electronic control device and the energy storage device.

DESCRIPTION OF THE FIGURES

While the specification concludes with claims particularly pointing out and distinctly claiming the present invention, it is believed that the present invention will be better understood from the following description in conjunction with the accompanying Drawing Figures, in which like reference numerals identify like elements, and wherein:

DETAILED DESCRIPTION

Figure 1:
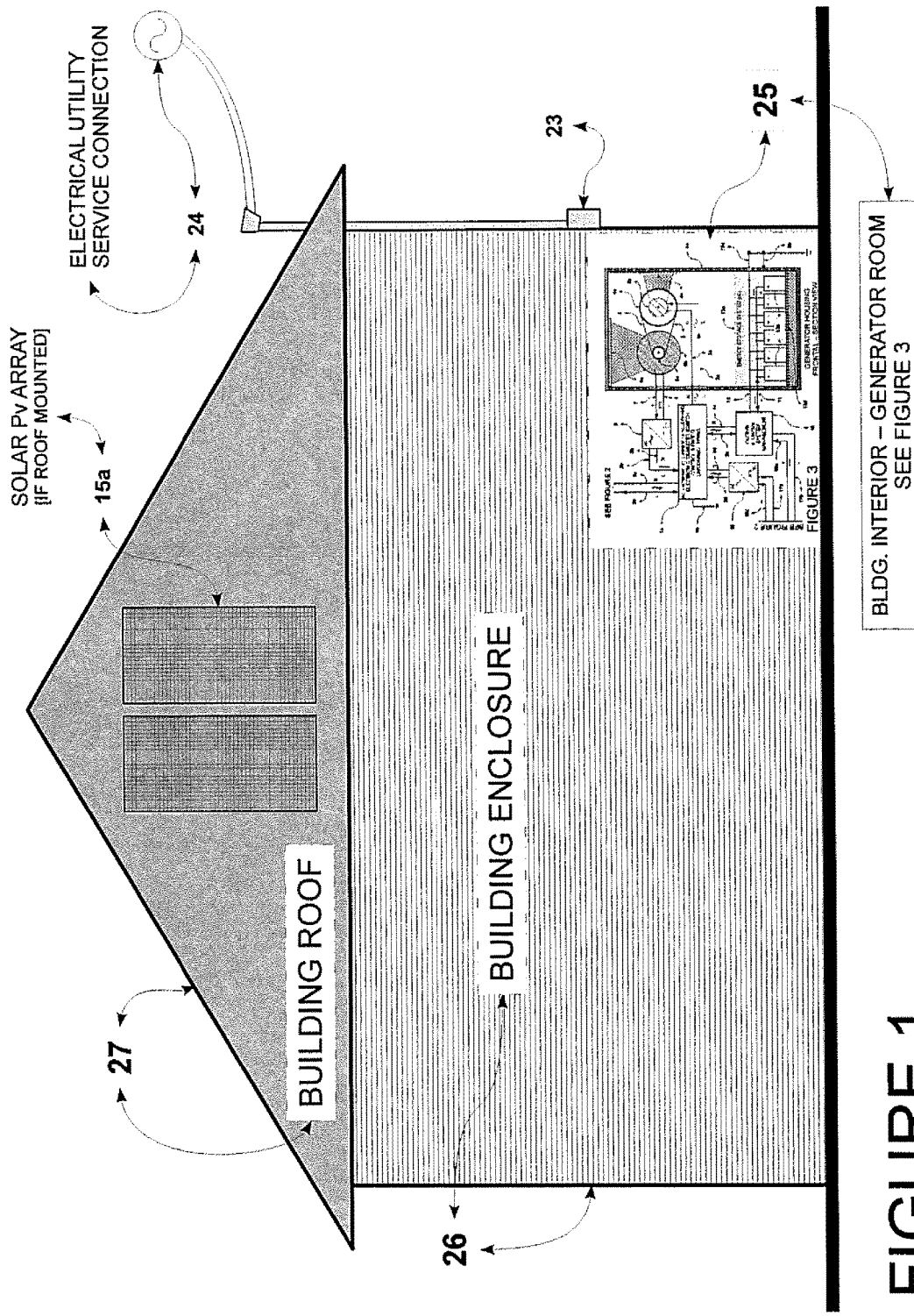
FIG. 1 is an elevation view and partial cross-sectional view of a building structure incorporating a regenerative power supply and method according to aspects of the present invention.

In the following detailed description of the preferred embodiment, reference is made to the accompanying drawings that form a part hereof, and in which is shown by way of illustration, and not by way of limitation, a specific preferred embodiment in which the invention may be practiced. It is to be understood that other embodiments may be utilized and that changes may be made without departing from the spirit and scope of the present invention.

The regenerative power supply system and method of the present invention is designed to be a principal source of electricity generation to supplant dependence on a local electrical utility. Additionally, solar energy harvested by a solar photovoltaic array is used in the present invention as a backup power supply to the electricity produced by the dynamo-electric generator, thereby mediating the supply of energy from the system and bolstering its stand-alone potential as a distributed power source that may be independent of the grid.

The present invention is not limited in its ability to generate power and store energy continuously every day of the year, at all hours of the day regardless of seasonal conditions or access to natural resources, such as sunlight. The system described in this disclosure generates power continuously so that the system may meet all or part of the electricity required to operate a particular facility, building or electricity consuming process. As the system produces energy at all hours of the day, the surplus energy that is not stored in an energy storage device (e.g., an electrical battery bank) is recaptured to regenerate the process, consumed by on-site load demands, or can be fed back into a local electric utility grid. The value of this energy as tracked by a smart grid meter may be credited back to the consumer who is now also a producer of energy in their own right.

The present invention utilizes simple, durable and dependable components that have long useful lifespans and may operate for long periods of time with little maintenance. Further, the system of the present invention is unaffected by inclement weather, the fluctuations of prevailing electricity rates or failures within the nation's electrical grid and power generation facilities. The security of such energy production as described in this disclosure may serve to insulate a user of the system from the economic volatility of the global marketplace while also mediating the detrimental effects of disruptions to electrical service from local utility systems. Severe weather that is the result of normal seasonal conditions or so-called "super-storms" that a growing number of scientists believe is a consequence of global warming have proven to be disruptive to normal electricity supply from utility scale power generating and transmission systems. Power brown-outs and extended black-outs are also a consequence of overloads on the national electricity infrastructure that are exacerbated by intense peak demands on the utility grid and generation systems.

The present invention addresses remaining needs in the art, including the distributed (on-site) generation of electricity in an ultra-efficient manner that recaptures some of its own power so as to regenerate its own energy inputs that drive the principal power generation components of the system. The regenerative power supply system and method of the present invention is able to act as a normal source of electricity to meet on-site load demands while also supplying excess power production to a local electrical utility system grid. Furthermore, the present invention is able to intelligently coordinate the flow of power to and from and within the components of the system itself. The coordination of the flow of power according to aspects of the present invention includes control of electrical power to on-site electrical loads as well as control to and from external sources of power such as an electrical utility.

Reference is now made to FIG. 1 which shows a building structure that contains a regenerative power supply system according to aspects of the present invention. A building enclosure 26 includes a building roof 27 and a building interior having a generator room 25. The regenerative power supply system according to one embodiment of the present invention is connected to an electrical utility system grid 24 that supplies electricity to the regenerative power supply system. Additionally, the regenerative power supply system is connected to the electrical utility system grid 24 through a smart grid meter 23 when surplus energy is available to be fed back into the electrical utility system grid 24.

In a preferred embodiment of the present invention, a distributed power source is included in the present invention. As shown in FIG. 1, a distributed power source such as a solar photovoltaic array 15a is provided. In the preferred embodiment, the solar photovoltaic array 15a is mounted on the building roof 27, as shown in FIG. 1. However, the solar photovoltaic array 15a may be mounted at any location that permits sunlight to reach it. Further, any other renewable source of energy, including but not limited to a wind, water, or geothermal energy source, is contemplated as a distributed power source under the present invention.

Figure 2:
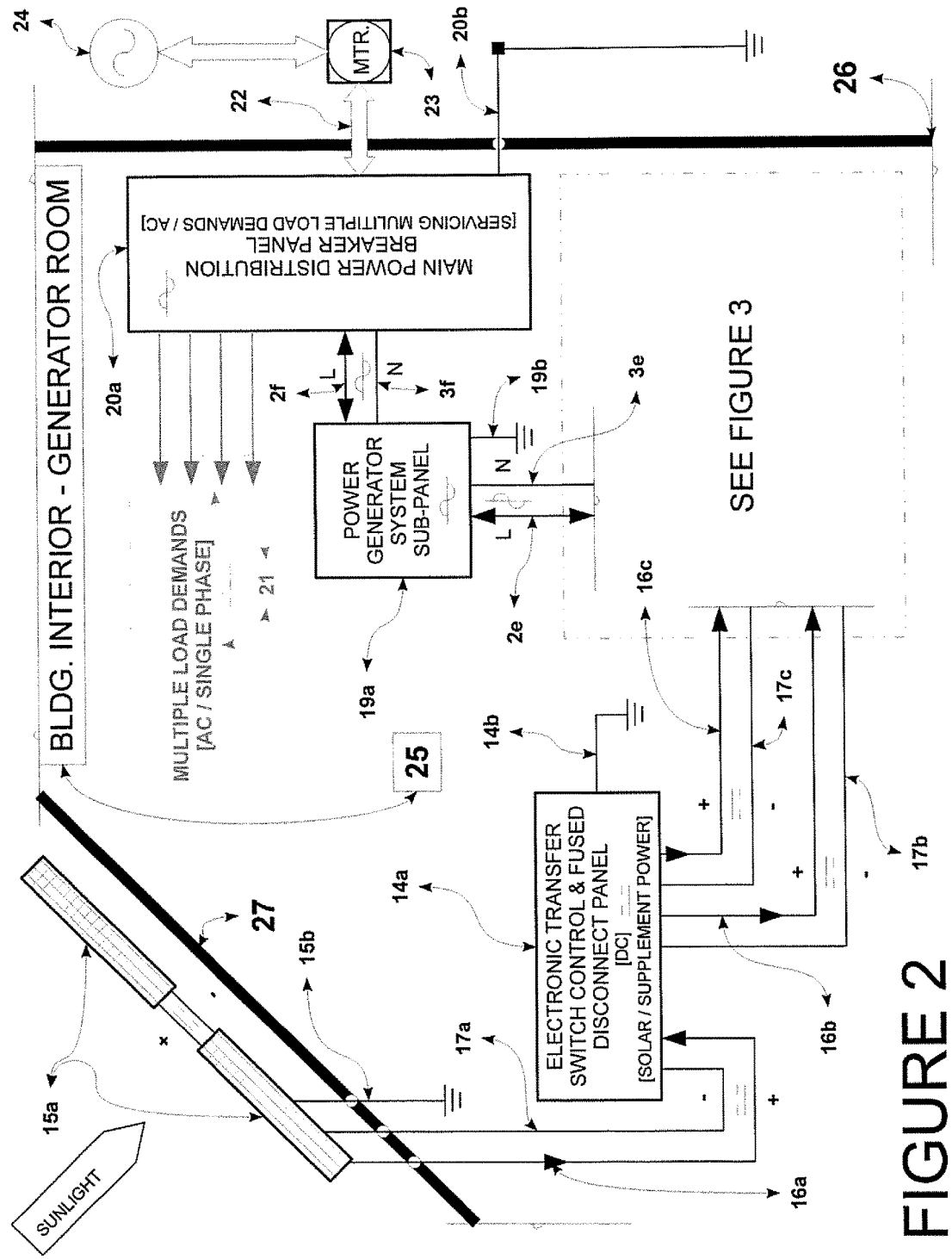
FIG. 2 is a schematic view of a regenerative power supply and method according to aspects of the present invention.

Turning now to FIG. 2, the smart grid meter 23 connects to a main AC power distribution breaker panel 20a of the regenerative power supply system via an electrical utility service connection 22. The main AC power distribution breaker panel 20a is grounded via grounding line 20b, as shown in the preferred embodiment of FIG. 2. Further, the main AC power distribution breaker panel 20a is wired to multiple AC bad demands 21, as shown in FIG. 2, and a generator system sub-panel 19a via AC power lead 2f and AC neutral line 3f. The generator system sub-panel 19a isolates the regenerative power supply system from the main AC power distribution breaker panel 20a that services the building enclosure 26 and the electrical utility system grid 24 such that the regenerative power supply system may be shut off for maintenance. Additionally, AC power lead 2f and AC neutral line 3f may be fuse protected against short-circuits and power surges.

Referring still to FIG. 2, the solar photovoltaic array 15a in the preferred embodiment is connected to a supplemental electronic control device 14a via negative direct current (DC) line 17a and DC power lead 16a that pass through the roof 27 to the interior of the building. Additionally, the solar photovoltaic array 15a is grounded via grounding line 15b. The sizing of the DC leads and lines of the solar photovoltaic array 15a are preferably determined by the output of the solar photovoltaic array 15a and energy storage system capabilities and are preferably protected within sheathing or a conduit. The supplemental electronic control device 14a of the preferred embodiment is an electronic DC transfer switch control and fused disconnect panel that controls the flow of DC power from the solar photovoltaic array 15a to the power generation and energy storage components of the regenerative power supply system. In another embodiment of the present invention, the supplemental electronic control device 14a may be used to combine multiple parallel series of solar photovoltaic arrays or panels.

Figure 3:
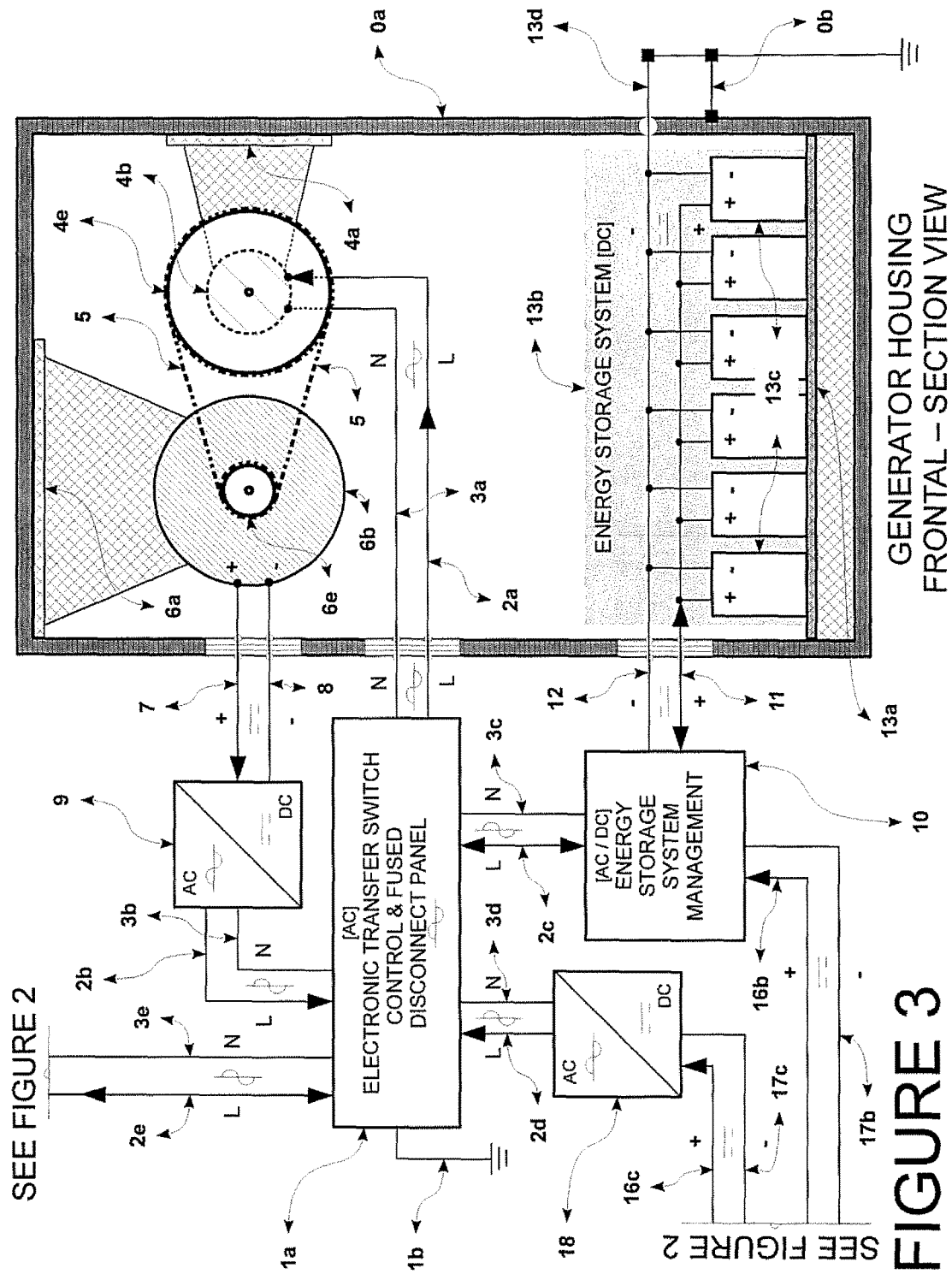
FIG. 3 is a schematic view of a regenerative power supply and method according to aspects of the present invention.

Referring now to FIG. 3, the generator system sub-panel 19a of the preferred embodiment is connected to a main electronic control device 1a via AC power lead 2e and AC neutral lead 3e. Main electronic control device 1a is preferably an electronic AC transfer switch control and fused disconnect panel that controls the operation of an electric drive motor 4b and, indirectly, the operation of a dynamo-electric generator 6b and its ability to generate electricity, as well as the flow of AC power to and from and within the regenerative power supply system itself, regardless of power source. As shown in the preferred embodiment of FIG. 3, AC power lead 2a and AC neutral line 3a connect the main electronic control device 1a to the electric drive motor 4b having coupled thereto a drive motor gear wheel 4e. The drive motor gear wheel 4e is mechanically linked to a generator gear wheel 6e of the dynamo-electric generator 6b via a synchronous timing belt 5 to form a transmission device. As shown in FIG. 3, the drive motor gear wheel 4e is significantly larger than the generator gear wheel 6e such that, when the electric drive motor 4b drives the dynamo-electric generator 6b, the generator 6b rotates faster than the electric drive motor 4b. The electric drive motor 4b is mounted to an interior wall of the generator room 25 via motor mounting bracket 4a and the dynamo-electric generator 6b is mounted to an interior wall of the generator room 25 via a generator mounting bracket 6a.

An alternative embodiment of the present invention may include the electric drive motor gear wheel 4e being smaller than the generator gear wheel 6e. A smaller electric drive motor gear wheel 4e allows a greater amount of torque to be applied to the generator gear wheel 6e. Similarly, the transmission device that includes the belt 5 and gear wheels 4e, 6e may further include multiple gear wheels on each of the generator and the motor. Further, the transmission device may comprise a continuously-variable transmission (CVT) to allow an essentially infinite number of gearing combinations between the motor and generator such that the exchange of speed for torque of the generator may be varied to accommodate the load demand of the generator in real time.

Figure 4:
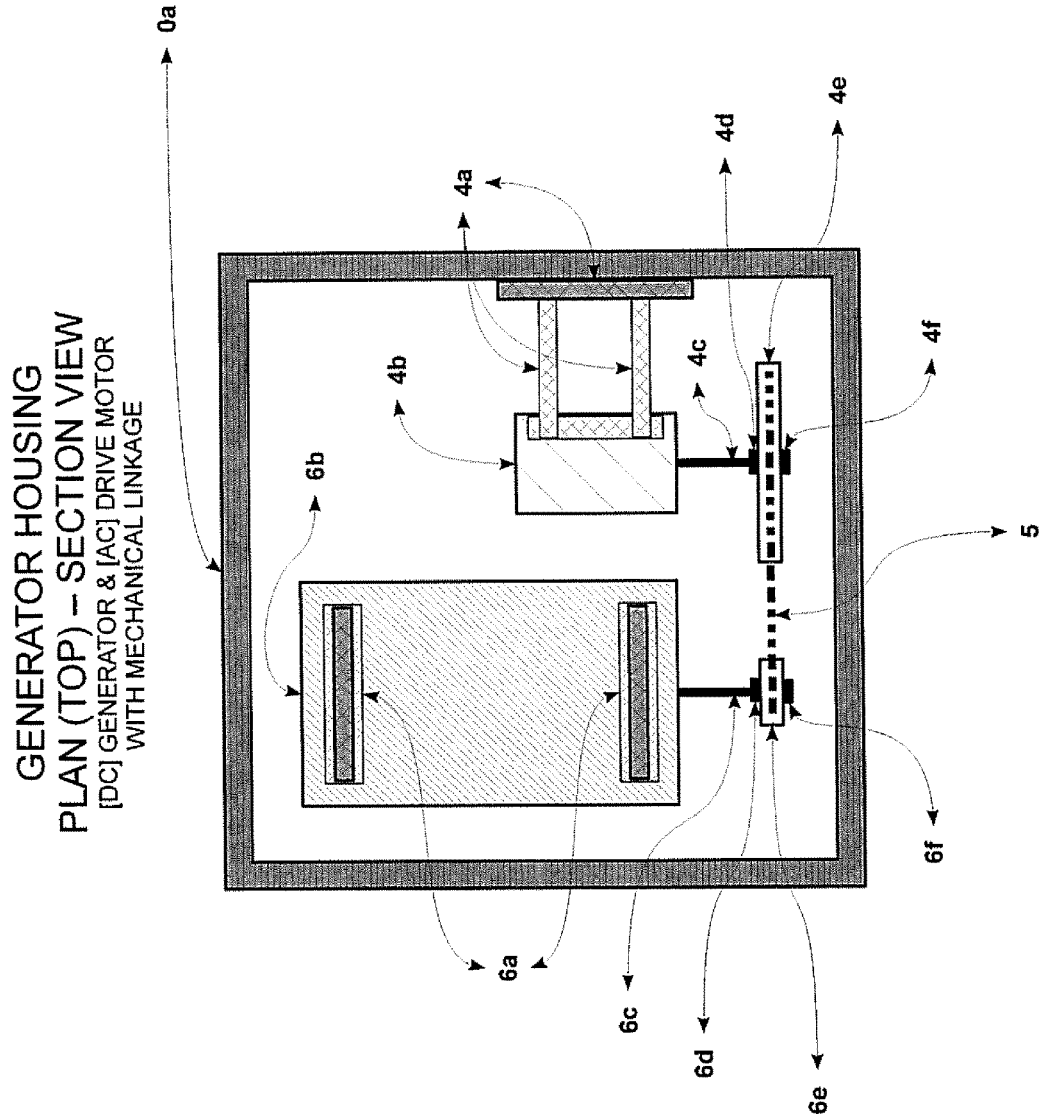
FIG. 4 is a cross-sectional view of a dynamo-electric generator, electric drive motor, and transmission device according to aspects of the present invention.

The structure of the electric drive motor 4b, dynamo-electric generator 6b, and transmission device including belt 5 of the preferred embodiment are shown in detail in FIG. 4. FIG. 4 illustrates the electrical drive motor 4b having a rotary shaft 4c with the drive motor gear wheel 4e secured by lock rings 4*d* and 4*f*. Similarly, the dynamo-electric generator 6*b* has a rotary shaft 6*c* with the generator gear wheel 6*e* secured by lock rings 6*d* and 6*f*. The drive motor gear wheel 4*e* and the generator gear wheel 6*e* are preferably constructed from metal, ceramic or other appropriate rigid, lightweight, high-strength material. Additionally, the gear wheels 4*e*, 6*e* have equal pitch but have different radii. The generator gear wheel 6*e* is secured on the rotary shaft 6*c* of the dynamo-electric generator 6*b* and the larger gear secured on the rotary shaft 4*c* of the electric drive motor 4*b* in order to create a mechanical advantage that augments the rotary speed of the electric drive motor 4*b*. This is translated via the mechanical drive linkage of the belt 5 to the dynamo-electric generator 6*b* enabling the electrical drive motor 4*b* to drive a generator of larger capacity. The electric drive motor 4*b*, as shown in the preferred embodiment, has an approximate capacity of up to, but not limited to 5 Horsepower.

Referring again to FIG. 3, dynamo-electric generator 6*b* produces DC electricity that flows via positive DC line 7 and negative DC line 8 to generator inverter 9, which converts the DC electricity into AC electricity. AC power lead 2*b* and AC neutral lead 3*b* send the AC electricity to the main electronic control device 1*a*. Additionally, the DC electricity flowing from the supplemental electronic control device 14*a* flows through lines 16*c* and 17*c* to be converted into AC electricity at supplemental inverter 18. The lines 2*d* and 3*d* carry the AC electricity to the main electronic control device 1*a*. The AC electricity in lines 2*d* and 3*d* can be used to power the electric drive motor 4*b* or supplement the electrical utility system grid 24. The dynamo-electric generator 6*b*, as shown in the preferred embodiment, has an approximate capacity of up to, but not limited to 50 kW.

An alternative embodiment of the present invention may include an alternator in place of the dynamo-electric generator 6*b*. The presence of an alternator would allow generation of AC electricity directly from the mechanical transmission of power from the electric drive motor 4*b*. This alternative embodiment would eliminate the need for the generator inverter 9 and the DC lines 7, 8. Another alternative embodiment may include electric drive motor 4*b* being driven by DC electricity rather than AC electricity. The use of a DC electric drive motor would require that AC lines 2*a*, 3*a* become DC lines and the energy storage management device 10 would no longer have to rectify the DC power from the energy storage device 13*b* and the supplemental power produced by the solar array 15*a*.

The DC electricity flowing from the supplemental electronic control device 14*a* may flow through lines 16*b* and 17*b* to an energy storage management device 10, AC electricity may also flow into the energy storage management device 10 from the main electronic control device 1*a* via lines 2*c* and 3*c*. AC electricity is converted into DC electricity and is supplemented with available DC electricity in the energy storage management device 10 before being sent to an energy storage device 13*b* via lines 11 and 12. In the preferred embodiment shown in FIG. 3, energy storage device 13*b* includes a bank of electrical batteries 13*c*. Further, the energy storage device 13*b* may include grounding 13*d*. The energy storage device 13*b* may provide initial electricity required to start the regenerative power supply system, act as a backup power supply, or mediate the power supply required by electrical drive motor 4*b*. Further, the energy storage device 13*b* may be recharged from a variety of power sources including, but not limited to, the dynamo-electric generator 6*b*, an electrical utility system grid 24, a renewable energy source such as the solar photovoltaic array 15*a* and/or some other type of distributed power source that may be present. In an alternative embodiment of the present invention, energy storage device 13*b* may include a mechanical storage means such as an inertial energy storage system utilizing a flywheel, for example.

The electronic control devices of the present invention, including main electronic control device 1*a*, energy storage management device 10, supplemental electronic control device 14*a*, generator system sub-panel 19*a*, or main AC power distribution breaker panel 20*a*, may include specific logic or circuit overlays in order to accomplish the desired function of AC or DC electricity flow as described in each of the embodiments of the preferred embodiment.

A distributed power source such as the solar photovoltaic array 15*a* of the preferred embodiment is capable of recharging the energy storage device 13*b*, supplying supplemental power to the electric drive motor 4*b*, the load demands serviced by the system and/or the electrical utility system grid 24 if the system is grid-connected and surplus solar or other supplemental electricity is produced. The distributed power source such as the solar photovoltaic array 15*a* of the preferred embodiment may serve as means to initiate the start-up of the electrical drive motor 4*b* and the process of power generation as represented by the operation of the dynamo-electric generator 6*b*. The distributed power source such as the solar photovoltaic 15*a* of the preferred embodiment may also provide the electricity required for the initial charging cycle of the energy storage device 13*b*, as well as a constant trickle charge as required by efficiency losses within such a device as represented by a backup battery system. This also has the benefit of minimizing deep cycling of the batteries and thus extending their useful life. In the event of a power failure from the electrical utility system grid 24, or for systems that are not grid-connected, or during any lapse in power from the dynamo-electric motor 6*b*, the distributed power source such as the solar photovoltaic array 15*a* of the preferred embodiment may recharge the energy storage device 13*b* to provide continuous power to the building enclosure 26.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A regenerative power supply system for supplying electric power to at least one of: an electric load or an electric power distribution grid, of a building or facility, comprising:
   a dynamo-electric generator;
   an electric drive motor coupled to said generator;
   a transmission device coupling said generator to said electric drive motor;
   an energy storage device configured to provide a backup power supply to the regenerative power supply system;
   an electronic control device configured to control a flow of electricity to said electric drive motor and to at least one of: the electric load or the electric power distribution grid, of the building or facility; and
   an energy storage management device configured to control a flow of electricity between said electronic control device and said energy storage device.

2. The regenerative power supply system of claim 1, wherein said transmission device comprises a first wheel coupled to said electric drive motor, a second wheel coupled to said dynamo-electric generator that is smaller than said first wheel and mechanical drive linkage coupling said first wheel and said second wheel such that said dynamo-electric generator rotates at an angular velocity greater than an angular velocity of said electric drive motor.

3. The regenerative power supply system of claim 1, further comprising a distributed power source distinct from an electrical grid power source.

4. The regenerative power supply system of claim 3, wherein said distributed power source comprises a solar photovoltaic array configured to recharge said energy storage device.

5. The regenerative power supply system of claim 1, wherein said dynamo-electric generator supplies electricity to meet load demands of the regenerative power supply system.

6. The regenerative power supply system of claim 1, wherein said dynamo-electric generator supplies electricity to a local electrical utility system grid.

7. The regenerative power supply system of claim 1, wherein said dynamo-electric generator supplies electricity to said energy storage device.

8. The regenerative power supply system of claim 3, further comprising a power inverter configured to convert direct current electricity stored in said energy storage device or generated by said distributed power source into alternating current to meet load demands of the regenerative power supply system or said electric drive motor, or to provide supplemental electricity to said electrical grid power source.

9. The regenerative power supply system of claim 8, further comprising a second power inverter configured to convert direct current electricity produced by said dynamo-electric generator into alternating current to recharge said energy storage device, meet load demands of the regenerative power supply system or provide supplemental electricity to said electrical grid power source.

10. The regenerative power supply system of claim 1, wherein said energy storage device comprises an electrical battery bank.

11. The regenerative power supply system of claim 1, wherein said electronic control device comprises an alternating current transfer control switch and fused disconnect panel to control flow of alternating current electricity within the regenerative power supply system.

12. The regenerative power supply system of claim 11, wherein said energy storage management device controls a flow of electricity between said electronic control device and said energy storage device.

* * * * *